US 6,692,654 B2

United States Patent
Osumi et al.

(10) Patent No.: US 6,692,654 B2
(45) Date of Patent: Feb. 17, 2004

(54) REFRIGERATING MACHINE OIL

(75) Inventors: Tomomasa Osumi, Yokohama (JP); Hiroyuki Hirano, Yokohama (JP); Yasuyuki Watanabe, Tokyo (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 10/086,919

(22) Filed: Feb. 28, 2002

(65) Prior Publication Data
US 2002/0123436 A1 Sep. 5, 2002

Related U.S. Application Data

(63) Continuation of application No. 09/405,323, filed on Sep. 24, 1999, now abandoned.

(30) Foreign Application Priority Data

Sep. 29, 1998 (JP) ............................................. 10-275571

(51) Int. Cl.⁷ ........................ C09K 5/04; C10M 105/32
(52) U.S. Cl. ........................ 252/68; 508/421; 508/460; 508/485; 508/501
(58) Field of Search .............................. 252/68; 508/460

(56) References Cited

U.S. PATENT DOCUMENTS

| 5,279,752 A | 1/1994 | Hasegawa et al. | |
| 5,326,486 A | 7/1994 | Mizui et al. | |
| 5,656,578 A | 8/1997 | Tanaka et al. | |
| 5,728,655 A | 3/1998 | Muraki et al. | |
| 5,798,319 A | 8/1998 | Schlosberg et al. | |
| 5,806,336 A | 9/1998 | Sunaga et al. | |
| RE36,293 E | 9/1999 | Mizui et al. | |
| 6,013,609 A | 1/2000 | Katafuchi | |
| 6,029,459 A | 2/2000 | Iizuka et al. | |
| 6,153,118 A * | 11/2000 | Hasegawa et al. | 252/68 |
| 6,228,282 B1 * | 5/2001 | Shimomura et al. | 252/68 |
| 6,231,782 B1 * | 5/2001 | Shimomura et al. | 252/68 |
| 6,263,683 B1 | 7/2001 | Tazaki | |
| 6,306,803 B1 * | 10/2001 | Tazaki | 508/539 |
| 6,354,094 B2 * | 3/2002 | Tazaki | 62/114 |
| 6,355,186 B1 * | 3/2002 | Shimomura et al. | 252/68 |
| 6,410,492 B1 * | 6/2002 | Shimomura et al. | 508/485 |
| 6,582,621 B1 * | 6/2003 | Sasaki et al. | 252/68 |

FOREIGN PATENT DOCUMENTS

| EP | 0 534 735 A1 | 3/1993 |
| EP | 0 997 519 A | 5/2000 |
| EP | 1 018 538 A | 7/2000 |
| GB | 1 602 092 | 11/1981 |
| GB | 2 306 497 A | 5/1997 |
| JP | 10046168 | 2/1998 |

* cited by examiner

*Primary Examiner*—Ellen M. McAvoy
(74) *Attorney, Agent, or Firm*—Akin Gump Strauss Hauer & Feld, L.L.P.

(57) ABSTRACT

Refrigerating machine oils comprising an ester oil for use with a refrigerant containing carbon dioxide are described. The refrigerating machine oils have excellent lubricity, miscibility with a refrigerant, stability and electric insulation.

7 Claims, No Drawings

REFRIGERATING MACHINE OIL

CROSS-REFERENCE TO RELATED APPLICATIONS

This is a continuation of U.S. application Ser. No. 09/405,323, filed Sep. 24, 1999, now abandoned.

BACKGROUND OF THE INVENTION

This invention relates to refrigerating machine oils and more particularly to refrigerating machine oils for use with a refrigerant containing carbon dioxide ($CO_2$).

Due to the recent issues concerning the ozone shield depletion, conventional refrigerants for refrigerating machine such as CFC (chlorofluorocarbon) and HCFC (hydrochlorofluorocarbon) have been targeted for regulation. In place of these refrigerants, HFC (hydrofluorocarbon) has been used as such a refrigerant. However, since the HFC refrigerant also has a problem that it is high in Global Warming Potential (GWP), it has been considered to use refrigerants containing natural materials as alternative refrigerants for the fluorocarbon type refrigerants. Among these alternative refrigerants, carbon dioxide ($CO_2$) has conventionally been used as a refrigerant for refrigerating machines because it is harmless to the environment, superior in safety, advantageous in miscibility with refrigerating machine oils and the materials forming a refrigerating machine, and has availability. Recently, it has been considered to apply carbon dioxide as a refrigerant for air conditioners of automobiles using an open- or hermetic-type compressor.

It also has been considered to use hydrocarbon base oils as disclosed in Japanese Patent Laid-Open Publication No. 10-46168 and ether oils such as polyalkylene glycol or polyvinyl ether, as disclosed in Japanese Patent Laid-Open Publication No. 10-46169, as a refrigerating machine oil to be used together with a $CO_2$ refrigerant. However, these conventional refrigerating oils are not satisfactory in use with the $CO_2$ refrigerant because of its poor miscibility therewith, resulting in various malfunctions in practical use, such as the deterioration of an important property, that is, the returnability of the oil in the refrigerating system and in poor lubricity leading to seizure of a compressor and a reduction in refrigerating efficiency.

Since a refrigerating machine oil is also required to perform a role of an insulating oil, when used in a hermetic type compressor, a refrigerating machine oil containing polyalkylene glycol which is poor in electric insulation is not appropriate for such hermetic type compressors. Therefore, it is hastened to develop a refrigerating machine oil which meets all of the requirements such as lubricity, miscibility with a refrigerant, stability and electric insulation, in a well-balanced manner.

In view of the foregoing, an object of the present invention is to provide a refrigerating machine oil which can exert excellent properties such as lubricity, miscibility with a refrigerant, stability and electric insulation when used together with a refrigerant containing carbon dioxide.

It has now been found after extensive research that use of an ester oil makes it possible to produce a refrigerating machine oil for use with a $CO_2$ refrigerant which is superior in various properties, such as lubricity, miscibility with a refrigerant, stability and electric insulation.

BRIEF SUMMARY OF THE INVENTION

According to the present invention, there is provided a refrigerating machine oil which comprises a carbonic ester for use with a refrigerant containing carbon dioxide. A fluid composition comprising the refrigerating machine oil and a refrigerant containing carbon dioxide is also provided.

DETAILED DESCRIPTION OF THE INVENTION

The refrigerating machine oil according to the present invention comprises an ester oil.

Eligible ester oils for the present invention are an aromatic ester, a dibasic ester, a polyol ester, a complex ester, a carbonic ester and a mixture thereof.

The aromatic ester may be an ester of an aromatic carboxylic acid having 1 to 6, preferably 1 to 4, more preferably 1 to 3 valencies and an aliphatic alcohol having 1 to 18, preferably 1 to 12 carbon atoms. Specific examples of such an aromatic carboxylic acid are benzoic acid, phthalic acid, isophthalic acid, terephthalic acid, trimellitic acid, pyromellitic acid and a mixture thereof. The aliphatic alcohol having 1 to 18 carbon atoms may be straight-chain or branched. Specific examples of such aliphatic alcohols are methanol, ethanol, straight or branched propanol, straight or branched butanol, straight or branched pentanol, straight or branched hexanol, straight or branched heptanol, straight or branched octanol, straight or branched nonanol, straight or branched decanol, straight or branched undecanol, straight or branched dodecanol, straight or branched tridecanol, straight or branched tetradecanol, straight or branched pentadecanol, straight or branched hexadecanol, straight or branched heptadecanol, straight or branched octadecanol and a mixture thereof.

Specific examples of the aromatic ester are dibutyl phthalate, di(2-ethylhexyl)phathalate, dinonyl phthalate, didecyl phthalate, didodecyl phthalate, ditridecyl phthalate, tributyl trimellitate, tri(2-ethylhexyl) trimellitate, trinonyl trimellitate, tridecyl trimellitate, tridodecyl trimellitate and tritridecyl trimellitate.

Needless to mention, when an aromatic carboxylic acid having at least two valences is used, it may be a simple ester made from one kind of an aliphatic alcohol or a complex ester made from at least two kinds of aliphatic alcohols.

The dibasic ester may be an ester obtained by reacting a dibasic acid having 5 to 10 carbon atoms such as glutamic acid, adipic acid, pimelic acid, suberic acid, azealic acid or sebacic acid, with a monohydric alcohol having 1 to 15 carbon atoms and a straight or branched alkyl group, such as methanol, ethanol, propanol, butanol, hexanol, heptanol, octanol, nonanol, decanol, undecanol, dodecanol, tridecanol, tetradecanol or pentadecanol, or a mixture of these esters. Specific examples of these esters are ditridecyl glutarate, di 2-ethylhexyl adipate, diisodecyl adipate, ditridecyl adipate, di 2-ethylhexyl sebacate and a mixture thereof.

The polyol esters may be esters of a diol or a polyol having 3 to 20 hydroxyl groups and a fatty acid having 6 to 20 carbon atoms. Specific examples of the diol are ethylene glycol, 1,3-propanediol, propylene glycol, 1,4-butane diol, 1,2-butane diol, 2-methyl-1,3-propane diol, 1,5-pentane diol, neopentyl glycol, 1,6-hexane diol, 2-methyl-2-methyl-1,3-propane diol, 1,7-heptane diol, 2-methylol-2-propyl-1,3-propane diol, 2,2-diethyl-1,3-propane diol, 1,8-octane diol, 1,9-nonane diol, 1,10-decane diol, 1,1,1-undecane diol and 1,12-dodecane diol. Specific examples of such polyols are polyalcohols such as trimethylol ethane, trimethylol propane, trimethylol butane, di-(trimethylol propane), tri-(trimethylol propane), pentaerythritol, di-(pentaerythritol), tri-(penthaerythritol), glycerin, polyglycerin (glycerin dimers to icosomer), 1,3,5-penthaerythritol, sorbitol, sorbitan, sorbitol-glycerin condensate, adonitol, arabitol, xylitol and mannitol; saccharides such as xylose, arabinose, ribose, rhamnose, glucose, fructose, galactose, mannose, sorbose, cellobiose, maltose, isomaltose, trehalose, sucrose, raffinose, gentianose and melezitose; the partially etherified products of these polyalcohols and saccharides; and methylglucoside. Among these, preferred polyols are hindered alcohols such as neopentyl glycol, trimethylol ethane, trimethylol propane, trimethylol butane, di-(trimethylol propane), tri-(trimethylol propane), penthaerythritol, di-(pentaerythritol) and tri-(penthaerythritol).

Although the carbon number of the fatty acid is not particularly restricted, a fatty acid having 1 to 24 carbon atoms is usually used. Among such fatty acids, preferred are those having more than 3 carbon atoms, more preferred are those having more than 4 carbon atoms, further more preferred are those having more than 5 carbon atoms, and the most preferred are those having more than 10 carbon atoms in view of lubricity. In view of miscibility with a refrigerant, preferred fatty acids are those having fewer than 18 carbon atoms, more preferred are those having fewer than 12 carbon atoms, further more preferred are those having fewer than 9 carbon atoms.

Furthermore, the fatty acids may be of straight-chain or branched type. In view of lubricity, preferred are straight fatty acids, while in view of hydrolysis stability, preferred are branched fatty acids. The fatty acids may be saturated or unsaturated ones.

Specific examples of such fatty acids are pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid and oleic acid, all of which may be straight or branched; or a neo acid where a carbon atom thereof is quartemary. More specific examples of the fatty acids are valeric acid (n-pentanoic acid), caproic acid (n-hexanoic acid), enathic acid (n-heptanoic acid), caprylic acid (n-octanoic acid), pelargonic acid (n-nonanoic acid), oleic acid (cis-9-octadecenoic acid), isopentanoic acid (3-methylbutanoic acid), 2-methylhexanoic acid, 2-ethylpentanoic acid, 2-ethylhexanoic acid and 3,5,5-trimethylhexanoic acid.

The polyol ester may be a partial ester having the hydroxyl groups of the polyol remaining unesterified, a full ester having the hydroxyl groups, all of which are esterified or a mixture of the partial ester and the full ester. Preferred are full esters.

A complex ester used herein designates an ester obtained by reacting a fatty and a dibasic acid with a monohydric alcohol and a polyol. Specific examples of eligible fatty acids, dibasic acids, monohydric alcohols and polyols for the complex ester may be the same as those exemplified above with respect to dibasic esters and polyol esters.

A carbonate ester used herein denotes those having the following carbonate ester structure in its molecules;

$$-C-O-\underset{\underset{O}{\|}}{C}-O-C-$$

The carbonate ester may contain one or more of the above structures per molecule.

Eligible alcohols for the carbonate ester are the above-exemplified aliphatic alcohols or polyols or, may be polyglycol and products which can be obtained by the addition reaction of polyglycol with polyol.

Needless to mention, the esters used herein may be those made from one kind of an ester of single structure or a mixture made from at least two kinds of esters having different structures.

Among the above exemplified various types of esters, preferred are polyol esters and carbonate esters.

Among polyol esters, preferred are esters of hindered alcohols such as neopentyl glycol, trimethylolethane, trimethylolpropane, trimethylolbutane, di-(trimethylolpropane), tri-(trimethylolpropane), pentaerythritol, di-(pentaerythritol) and tri-(pentaerythritol) and more preferred are esters of neopentyl glycol, trimethylolethane, trimethylolpropane, trimethylolbutane or penthaerythritol, in view of superior hydrolytic stability. Most preferred is an ester of penthaerythritol in view of particular superiority of miscibility with a refrigerant and hydrolytic stability.

Specific examples of preferred polyol esters are diesters of neopentyl glycol and at least one member selected from valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid and 3,5,5-timethylhexanoic acid; tri-esters of trimethylolethane and at least one member selected from valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid and 3,5,5-timethylhexanoic acid; tri-esters of trimethylolpropane and at least one member selected from valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid and 3,5,5-timethylhexanoic acid; triesters of trimethylolbutane and at least one member selected from valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid and 3,5,5-timethylhexanoic acid; and tetraesters of pentaerythritol and at least one member selected from valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid and 3,5,5-timethylhexanoic acid.

The esters comprising more than two kinds of fatty acids may be a mixture of more than two kinds of esters of one kind of fatty acid and polyol, or an ester of mixed fatty acids of more than two kinds and polyols. Esters of polyol and more than two kinds of fatty acids, particularly mixed fatty acids, are superior in properties at low temperatures and miscibility with a refrigerant.

Among the above exemplified carbonate esters, preferred are those having a structure represented by the formula $$(X^1O)_b-B-[O-(A^1O)_c-\underset{\underset{O}{\|}}{C}-O-(A^2O)_d-Y^1]_a \qquad (1)$$

wherein $X^1$ is a hydrogen atom, an alkyl group, a cycloalkyl group or a group represented by the formula $Y^2-(OA^3)_e-$ (2) wherein $Y^2$ is a hydrogen atom, an alkyl group or a cycloalkyl group, $A^3$ is an alkylene group having 2 to 4 carbon atoms and e is an integer of 1 to 50; $A^1$ and $A^2$ may be the same or different from each other and are each independently an alkylene group having 2 to 4 carbon atoms, $Y^1$ is a hydrogen atom, an alkyl group or a cycloalkyl group, B is a residue of a compound having 3 to 20 hydroxyl groups, a is an integer of 1 to 20 and b is an integer of 0 to 19, with the proviso that a +b 3 to 20, c is an integer of 0 to 50 and d is an integer of 1 to 50.

In Formula (1), $X^1$ is a hydrogen atom, an alkyl group, a cycloalkyl group or a group represented by Formula (2). Although not restricted, the alkyl group has generally 1 to 24, preferably 1 to 18, more preferably 1 to 12 carbon atoms. The alkyl group may be of straight-chain or branched type.

Specific examples of such alkyl groups are methyl, ethyl, n-propyl, isopropyl, n-butyl, isobutyl, sec-butyl, tert-butyl, straight or branched pentyl, straight or branched hexyl, straight or branched heptyl, straight or branched octyl, straight or branched nonyl, straight or branched decyl, straight or branched undecyl, straight or branched dodecyl, straight or branched tridecyl, straight or branched tetradecyl, straight or branched pentadecyl, straight or branched hexadecyl, straight or branched heptadecyl, straight or branched octadecyl, straight or branched nonadecyl, straight or branched icosyl, straight or branched heneicosyl, straight or branched docosyl, straight or branched tricosyl and straight or branched tetracosyl groups.

Specific examples of cycloalkyl groups are cyclopentyl, cyclohexyl and cycloheptyl groups.

In Formula (2), $A^3$ is an alkylene group having 2 to 24 carbon atoms. Specific examples of such an alkylene group are ethylene, propylene, trimethylene, butylene, tetramethylene, 1-methyltrimethylene, 2-methyltrimethylene, 1,1-dimethylethylene and 1,2-dimethylethylene groups.

In Formula (2), $Y^2$ is a hydrogen atom, an alkyl group or a cycloalkyl group. Although not restricted, the alkyl group has generally 1 to 24, preferably 1 to 18, more preferably 1 to 12 carbon atoms. The alkyl group may be of straight-chain or branched type. Specific examples of such alkyl groups are those exemplified with respect to $X^1$.

Specific examples of cycloalkyl groups are cyclopentyl, cyclohexyl and cycloheptyl groups.

$Y^2$ is preferably a hydrogen atom or an alkyl group having 1 to 12 carbon atoms and is more preferably a hydrogen atom or methyl, ethyl, n-propyl, iso-propyl, n-butyl, iso-butyl, sec-butyl, tert-butyl, n-pentyl, iso-pentyl, neo-pentyl, n-hexyl, iso-hexyl, n-heptyl, iso-heptyl, n-octyl, iso-octyl, n-nonyl, iso-nonyl, n-decyl, iso-dceyl, n-undecyl, iso-undecyl, n-dodecyl or iso-dodecyl group. e is an integer of 1 to 50.

$X^1$ is preferably a hydrogen atom, an alkyl group having 1 to 12 carbon atoms or a group represented by Formula (2). Preferred examples of $X^1$ are hydrogen atom, methyl, ethyl, n-propyl, iso-propyl, n-butyl, iso-butyl, sec-butyl, tert-butyl, n-pentyl, iso-pentyl, neo-pentyl, n-hexyl, iso-hexyl, n-heptyl, iso-heptyl, n-octyl, iso-octyl, n-nonyl, iso-nonyl, n-decyl, iso-dceyl, n-undecyl, iso-undecyl, n-dodecyl or iso-dodecyl group and a group represented by Formula (2).

Compounds having 3 to 20 hydroxyl groups and providing a residue for B are the above exemplified polyols.

$A^1$ and $A^2$ may be the same or different and are each independently a alkylene group having 2 to 4 carbon atoms. Specific examples of such alkylene groups are ethylene, propylene, trimethylene, butylene, tetramethylene, 1-methyltrimethylene, 2-methyltrimethylene, 1,1-dimethylethylene and 1,2-dimethylethylene.

$Y^1$ is a hydrogen atom, an alkyl group or a cycloalkyl group. Although not restricted, the alkyl group has generally 1 to 24, preferably 1 to 18, more preferably 1 to 12 carbon atoms. The alkyl group may be of straight-chain or branched chain type. Specific examples of such alkyl groups are those exemplified with respect to $X^1$.

Specific examples of cycloalkyl groups are cyclopentyl, cyclohexyl and cycloheptyl groups.

$Y^1$ is preferably a hydrogen atom or an alkyl group having 1 to 12 carbon atoms and is more preferably a hydrogen atom or methyl, ethyl, n-propyl, iso-propyl, n-butyl, iso-butyl, sec-butyl, tert-butyl, n-pentyl, iso-pentyl, neo-pentyl, n-hexyl, iso-hexyl, n-heptyl, iso-heptyl, n-octyl, iso-octyl, n-nonyl, iso-nonyl, n-decyl, iso-dceyl, n-undecyl, iso-undecyl, n-dodecyl or iso-dodecyl group.

In Formulae (1) and (2), c, d and e indicate the degree of polymerization at the polyoxyalkylene portions. These polyoxyalkylene portions may be the same or different. In the case where a plurality of different polyoxyalkylene group are contained, there is no restriction imposed on the polymerization form of oxyalkylene groups and thus it may be random polymerization or block polymerization.

Although no particular limitation is imposed on the production method of the carbonate esters to be used in the present invention, they may be obtained by reacting polyalkylene glycol polyolether produced by the addition reaction between a polyol compound and alkyleneoxide, with chloroformate in the presence of an alkali metal hydroxide such as sodium hydroxide and potassium hydroxide, an alkali metal alkoxide such as sodium methoxide and sodium ethoxide or an alkali such as metal sodium at a temperature of 0 to 30° C. Alternatively, the carbonate ester may be obtained by reacting polyalkylene glycol polyol ester in the presence of the source of carbonic acid such as carbonic acid diester and phosgen, an alkali metal hydroxide such as sodium hydroxide and potassium hydroxide, an alkali metal alkoxide such as sodium methoxide and sodium ethoxide or an alkali such as metal sodium at a temperature of 80 to 150° C. After this, free hydroxyl groups are etherified as required.

The product derived from the materials mentioned above may be subjected to refining treatment for removing the by-products and unreacted substances if any. However, small amounts of such by-products and unreacted substances may be present as long as they do not adversely affect the excellent characteristics of the inventive refrigerating machine oil.

In the present invention, carbonate ester may be used singly or in the form of a mixture. There is no particular restriction on the molecular weight of the carbonate esters used in the present invention. However, in view of enhancing the sealing performance of a compressor, it is preferred to use those having a number-average molecular weight of preferably 200 to 4,000, more preferably 300 to 3,000. Furthermore, the carbonate ester used in the present invention have a kinematic viscosity at 100° C. of preferably 2 to 150 $mm^2/s$, more preferably 4 to 100 $mm^2/s$.

The inventive refrigerating machine oil may comprises one or more than two members selected from the above-described ester oils.

Although not restricted, the content of the ester oil in the inventive refrigerating machine oil is within the range of preferably more than 50 mass percent, more preferably more than 70 mass percent, further more preferably more than 80 mass percent, based on the total mass of the refrigerating machine oil, in view of imparting the resulting oil with excellent lubricity, miscibility with a refrigerant, thermal and chemical stability and electric insulation.

The above-described ester oil may be used in combination with hydrocarbon oils such as mineral oils, olefin polymers, naphthalene compounds and alkylbenzene oils.

The refrigerating machine oil according to the present invention contains the ester oil and the hydrocarbon oil which is added as required, as a base oil. Although the inventive refrigerating machine oil can be put in use without being blended with any additives, it can be used in the form of a mixture with any of various additives.

The inventive refrigerating machine oil can be blended with at least one kind of a phosphorus compound selected from the group consisting of phosphoric esters, acidic phosphoric esters, amine salts of acidic phosphoric esters, chlorinated phosphoric esters and phosphorous esters in view of further improving the refrigerating apparatus in wear resistance and load resistance by the use of the inventive refrigerating machine oil.

Specific examples of the phosphoric esters are tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentradecyl phosphate, trihexadecyl phosphate, triheptadecyl phosphite, trioctadecyl phosphate, trioleyl phosphate, triphenyl phosphate, tricresyl phosphate, trixylyl phosphate, cresyldiphenyl phosphate and xylyldiphenyl phosphate.

Specific examples of the acidic phosphoric esters are monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phospahte, monooleyl acid phosphate, dibutyl acid phosphate, dipentyl acid phospahte, dihexyl acid phospahte, diheptyl acid phospahte, dioctyl acid phosphate, dinonyl acid phosphate, didecyl acid phosphate, diundecyl acid phosphate, didodecyl acid phophate, dirtridecyl acid phosphate, ditetradecyl acid phospahte, dipentadecyl acid phosphate, dihexadecyl acid phosphate, diheptadecyl acid phosphate, dioctadecyl acid phosphate and dioleyl acid phosphate.

Specific examples of the amine salts of acidic phosphoric esters are methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine of the acidic phosphoric ester.

Specific examples of the chlorinated phosphoric esters are tris-dichloropropyl phosphate, tris-chloroethyl phosphate, tris-chlorophenyl phosphate and polyoxyalkylene bis[di(chloroalkyl)] phosphate.

Specific examples of the phosphorous esters are dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phophite, trinonyl phosphite, tridecyl phosphite, triundecyl phosphite, tridodecyl phosphite, trioleyl phosphite, triphenyl phosphite and tricresyl phosphite.

Although these phosphorus compounds may be blended with the inventive refrigerating machine oil in any suitable ratio, their contents may be within the range of 0.01 to 5.0 mass percent, preferably 0.02 to 3.0 mass percent, based on the total mass of the refrigerating machine oil (based on the total mass of the base oil and the whole additives).

Furthermore, in order to improve the stability of the refrigerating machine oil according to the present invention, it may be blended with at least one kind of an epoxy compound selected from the group consisting of:

(1) phenylglycidyl ether type epoxy compounds, (2) alkylglycidyl ether type compounds, (3) glycidyl ester type epoxy compounds, (4) aryl oxirane compounds, (5) alkyl oxirane compounds, (6) alicyclic epoxy compounds, (7) epoxidized fatty monoesters and (8) epoxidized vegetable oils.

Specific examples of the phenylglycidyl ether type epoxy compounds (1) are phenylglycidyl ether and alkylphenylglycidyl ether. The alkylphenylglycidyl ether may be those having 1 to 3 alkyl groups each having 1 to 13 carbon atoms, preferably those having one alky group having 4 to 10 carbon atoms. Preferred examples of such alkylphenylglycidyl ethers are n-butylphenylglycidyl ether, i-butylphenylglycidyl ether, sec-butylphenylglycidyl ether, tert-butylphenylglycidyl ether, pentylphenylglycidyl ehter, hexylphenylglycidyl ether, heptylphenylglycidyl ehter, octylphenylglycidyl ether, nonylphenylglycidyl ehter and decylphenylglycidyl ehter.

Specific examples of the alkylglycidyl ether type compounds (2) are decylglycidyl ether, undecylglycidyl ether, dodecylglycidyl ether, tridecylglycidyl ether, tetradecylglycidyl ether, 2-ethylhexylglycidyl ether, neopentylglycoldiglycidyl ether, trimethylolpropane triglycidyl ehter, pentaerythritol tetraglycidyl ether, 1,6-hexanediol diglycidyl ether, sorbitol polyglycidyl ether, polyalkyleneglycol monoglycidyl ether and polyalkyleneglycol diglycidyl ether.

Specific examples of the glycidyl ester type epoxy compounds (3) are phenylglycidyl ester, alkylglycidyl ester and alkenylglycidyl ester. Preferred are glycidyl-2,2-dimethyloctanoate, glycidyl benzoate, glycidyl acrylate and glycidyl methacrylate.

Specific examples of the aryl oxirane compounds (4) are 1,2-epoxystyrene and alkyl-1,2-epoxystyrene.

Specific examples of the alkyl oxirane compounds (5) are 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyeicosane.

Specific examples of the alicyclic epoxy compounds (6) are 1,2-epoxycyclohexane, 1,2-epoxycyclopentane, 3,4-epoxycyclohexylmethyl-3,4-epoxycyclohexane carboxylate, bis(3,4-epoxycyclohexylmetyl) adipate, exo-2,3-epoxynorbomane, bis(3,4-epoxy-6-methycyclohexylmetyl) adipate, 2-(7-oxabicyclo[4.1.0]hept-3-yl)-spiro(1,3-dioxane-5,3'-[7]oxabicyclo[4.1.0]) heptane, 4-(1'-metylepoxyethyl)-1,2-epoxy-2-methylcyclohexane and 4-epoxyethyl-1,2-epoxycyclohexane.

Specific examples of the epoxidized fatty monoesters (7) are an ester formed by reacting an epoxidized fatty acid having 12 to 20 carbon atoms with an alcohol having 1 to 8 carbon atoms, phenol or alkylphenol. Particularly preferred are epoxystearates such as butyl, hexyl, benzyl, cyclohexyl, methoxyethyl, phenyl and butylphenyl esters of epoxystearic acid.

Specific examples of the epoxidized vegetable oils (8) epoxy compounds of vegetable oils such as soybean oil, linseed oil and cottonseed oil.

Among these epoxy compounds, preferred are phenylglycidyl ether type epoxy compounds, glycidyl ester type epoxy compounds, alicyclic epoxy compounds and epoxidized fatty monoesters. More preferred are phenylglycidyl ether type epoxy compounds and glycidyl ester type epoxy compounds. Particularly preferred are phenylglycidyl ether, butylphenylglycidyl ether, alkylglycidyl ester and mixtures thereof.

The inventive refrigerating machine oil may be blended with these epoxy compounds in any suitable blending ratio. The epoxy compound is generally blended in an amount of 0.1 to 5.0 mass percent, preferably 0.2 to 2.0 mass percent, based on the total mass of the refrigerating machine oil (based on the total mass of the base oil and the whole additives).

Needless to mention, more than two kinds of each of the phosphorus compounds and the epoxy compounds may be used in combination.

If necessary, in order to further enhance the properties of the refrigerating machine oil of the present invention, it may be blended with suitable conventional additive singlely or in combination. The suitable additives may be anti-oxidants of a phenol type such as di-tert-butyl-p-cresol and bisphenol A or of an amide type such as phenyl-$\alpha$-naphthyl amine and N,N-di(2-naphthyl)-p-phenylenediamine; anti-wear additives such as zinc dithiophosphate; extreme pressure agents such as chlorinated paraffin and sulfur compounds; oiliness improvers such as fatty acid; silicone-type antiforming agents; metal inactivators such as benzotriazole; viscosity index improvers; pour point depressants; and detergent-dispersants. These additives may be added in an amount of less than 10 mass percent, preferably less than 5 mass percent, based on the total mass of the refrigerating machine oil (based on the total mass of the base oil and the whole additives).

Although there is no particular restriction imposed on the kinematic viscosity of the refrigerating machine oil of the present invention, it preferably has a kinematic viscosity at 40° C. of preferably 3 to 100 mm$^2$/s, more preferably 4 to 50 mm$^2$/s, most preferably 5 to 40 mm$^2$/s and a kinematic viscosity at 100° C. of preferably 1 to 20 mm$^2$/s, more preferably 2 to 10 mm$^2$/s.

Although not restricted, the refrigerating machine oil of the present invention preferably has a volume resistivity of greater than $1.0 \times 10^{12}$ $\Omega \cdot$cm, preferably greater than $1.0 \times 10^{13}$ $\Omega \cdot$cm, more preferably greater than $1.0 \times 10^{14}$ $\Omega \cdot$cm. When refrigerating machine oils are used in a sealed type refrigerating machine, such volume resistivity is required to be high. The volume resistivity used herein denotes a value measured at a temperature of 40° C. in accordance with JIS C 2101 "Testing methods of electrical insulating oils".

The water content of the refrigerating machine oil of the present invention is not particularly restricted, but may be present within the range of preferably less than 200 ppm, more preferably less than 100 ppm, most preferably less than 50 ppm. When refrigerating machine oils are used in a sealed type refrigerating machine, less water contents are preferred in view of the stability and electric insulation of the oils.

The total acid value of the refrigerating machine oil of the present invention is not particularly restricted, but may be preferably less than 0.1 mgKOH/g, more preferably less than 0.05 mgKOH/g in order to prevent the corrosion of metals used in a refrigerating machine or pipes thereof. The total acid value used herein designates a total acid value measured in accordance with JIS K 2501 "Petroleum products and lubricants-Determination of neutralization number".

The ash content of the refrigerating machine oil of the present invention is not particularly restricted, but may be preferably less than 100 ppm, more preferably 50 ppm. The ash content used herein designates a value of ash content measured in accordance with JIS K 2272 "Testing Methods for Ash and Sulfated Ash of Crude Oil and Petroleum Products".

The refrigerant used in a refrigerating machine used together with the refrigerating machine oil according to the present invention is carbon dioxide or alternatively a mixture of carbon dioxide and hydrofluorocarbon and/or hydrocarbon.

The hydrofluorocarbon refrigerants may be hydrofluorocarbon having 1 to 3 carbon atoms, preferably 1 to 2 carbon atoms. Specific examples of the hydrofluorocarbon refrigerants are difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) and a mixture of at least two kinds of thereof.

These refrigerants are suitably selected in accordance with use and performances to be required. Preferred refrigerants are HFC-32 alone; HFC-23 alone; HFC-134a alone; HFC-125 alone; a mixture of HFC-134a/HFC-32 in a ratio of 60–80 mass %/40–20 mass %; a mixture of HFC-32/HFC-125 in a ratio of 40–70 mass %/60–30 mass %; a mixture of HFC-125/HFC-143a in a ratio of 40–60 mass %/60–40 mass %; a mixture of HFC-134a/HFC-32/HFC-125 in a ratio of 60 mass %/30 mass %/10 mass %; a mixture of HFC-134a/HFC-32/HFC-125 in a ratio of 40–70 mass %/15–35 mass %/5–40 mass % and a mixture of HFC-125/HFC-134a/HFC-143a in a ratio of 35–55 mass %/1–15 mass %/40–60 mass %. More specifically, the HFC refrigerant mixtures include a mixture of HFC-134a/HFC-32 in a ratio of 70 mass %/30 mass %; a mixture of HFC-32/HFC-125 in a ratio of 60 mass %/40 mass %; a mixture of HFC-32/HFC-125 in a ratio of 50 mass %/50 mass % (R410A); a mixture of HFC-32/HFC-125 in a ratio of 45 mass %/55 mass % (R410B); a mixture of HFC-125/HFC-143a in a ratio of 50 mass %/50 mass % (R507C); a mixture of HFC-32/HFC-125/HFC-134a in a ratio of 30 mass %/10 mass %/60 mass %; a mixture of HFC-32/HFC-125/HFC-134a in a ratio of 23 mass %/25 mass %/52 mass % (R407C); a mixture of HFC-32/HFC-125/HFC-134a in the ratio of 25 mass %/15 mass %/60 mass % (R407E) and a mixture of HFC-125/HFC-134a/HFC-143a in a ratio of 44 mass %/4 mass %/52 mass % (R404A).

The hydrocarbon refrigerants may be those which are gaseous at 25° C. and one atmospheric pressure. Specific examples of the hydrocarbon refrigerants are alkanes, cycloalkanes and alkenes each having 1 to 5 carbon atoms, preferably 1 to 4 carbon atoms, such as methane, ethylene, ethane, propylene, propane, cyclopropane, butane, isobutane, cyclobutane, methylcyclopropane and a mixture of at least two kinds thereof.

The blending ratio of carbon dioxide to hydrofluorocarbon and/or hydrocarbon refrigerants is not particularly restricted. The total amount of hydrofluorocarbon and/or hydrocarbon may be within the range of preferably 1 to 200 parts by weight, more preferably 10 to 100 parts by weight per 100 parts by weight of carbon dioxide.

The refrigerating machine oil according to the present invention is generally present in the form of a fluid composition admixed with carbon dioxide alone or with other refrigerants in a refrigerating machine. The mixing ratio of the inventive refrigerating machine oil to the refrigerants is not particularly restricted, but the refrigerating machine oil may be present in a ratio of 1 to 500 parts by weight, more preferably 2 to 400 parts by weight per 100 parts by weight of the refrigerant.

The refrigerating machine oil according to the present invention can be used as a lubricating oil for the refrigerant compressors of any types of refrigerating machine. Refrigerating machines to which the inventive refrigerating machine oil is applicable are room air conditioners, packaged air conditioning systems, refrigerators, automobile air conditioners, dehumidifiers, freezers, refrigerating chambers, vending machines, show-cases and cooling systems for chemical plants. Furthermore, the inventive refrigerating machine oil is preferably used in refrigerating machines having sealed compressors. The inventive refrigerating machine oil is also eligible for use in a reciprocating, rotary, or centrifugal type compressor.

This invention will be further described by way of the following examples which are provided for illustration purposes only.

INVENTIVE EXAMPLES 1–10 AND COMPARATIVE EXAMPLES 1–3

Sample oils of Inventive Examples 1 to 10 and Comparative Examples 1 to 3 were prepared by blending the base oils and additives given below in accordance with the formulations shown in Table 1. Table 1 also shows the properties (kinematic viscosity at 40° C. and 100° C. and total acid value) of each of the sample oils.

Base oil A: tetraester of pentaerythritol and n-heptanoic acid

Base oil B: tetraester of pentaerythritol and 2-ethylhexanoic acid

Base oil C: tetraester of pentaerythritol and a mixed fatty acid of n-pentanoic acid and 3,5,5-trimethylhexanoic acid (weight ratio: 30:70)

Base oil D: tetraester of pentaerythritol and a mixed fatty acid of 2-ethylhexanoic acid and 3,5,5-trimethylhexanoic acid (weight ratio: 50:50)

Base oil E: diester of neopentyl glycol and oleic acid

Base oil F: triester of trimethylolpropane and 3,5,5-trimethylhexanoic acid

Base oil G: hexaester of di-pentaerythritol and 3,5,5-trimethylhexanoic acid

Base oil H: diester of neopentyl glycol and 2-ethylhexanoic acid

Base oil I: monomethyl ether of polyoxyethyleneoxypropylene glycol (EO:PO=5:5(molar ratio), number-average molecular weight=1,000)

Base oil J: dimethyl ether of polyoxyethyleneoxypropylene glycol (EO:PO=5:5(molar ratio), number-average molecular weight=1,000)

Base oil K: copolymer of vinylethyl ether and vinylbutyl ether (polymerization ratio=7:1, number-average molecular weight=900)

Additive a: glycidyl-2,2-dimethyloctanoate

Additive b: tricresyl phosphate

Each of the sample oils was subjected to the following tests.

Miscibility Test 10 grams of each of the sample oils were blended with 40 grams of a $CO_2$ refrigerant and then subjected to a test in accordance with "Testing method of evaluating miscibility with a refrigerant" prescribed in JIS K 2211 "Refrigerating machine oils" to observe if the refrigerant ant the sample oil would dissolve in each other or if they would be separated from each other or turned into a white-turbid liquid, at a temperature of 0° C. The results are shown in Table 1.

Insulation Test

In accordance with JIS C 2101 "Testing method of electrical insulating oils", a test was conducted to measure the volume resistivity at 25° C. of each of the sample oils. The results are shown in Table 1.

Thermal Stability Test 90 grams of each of the sample oils, 30 grams of a $CO_2$ refrigerant and catalysts (wire-shaped iron, copper and aluminum) were charged into an autoclave and heated at 200° C. After two weeks, a test was conducted so as to observe the appearance of both of the sample oils and the catalysts and measure the volume resistivity and total acid value of each of the sample oils. The results are shown in Table 1.

Evaluation Test for Lubricity

In accordance with ASTM D 2670 "Falex Wear Test", each of the sample oils was subjected to a friction test in which a test machine was run under a load of 250 lb for two hours after being warmed up at an oil temperature of 100° C. under a load of 150 lb for a period of one minute. Each of the sample oils was evaluated by measuring the level of abrasion of the test journal (pin). The results are shown in Table 1.

Practical Test on a Refrigerating Machine

Each of the sample oils was evaluated in performances in practical use by conducting a practical test using a refrigerating machine comprising a compressor, a condenser, an expansion valve and an evaporator and a refrigerating cycle including an oil separator and a hot gas line, under the following conditions. After 700 hours operation, the refrigerating machine was disassembled to observe the interior thereof.

Test Conditions

Output: 100 W
Refrigerant ($CO_2$)/Oil=70:30 (weight ratio)
Intake temperature: 0° C.
Discharge temperature: 100° C.
Temperature at the outlet of the condenser: 10° C.

TABLE 1

| | base oil | (mass %) | Viscosity (mm2/s) 40° C. | Viscosity (mm2/s) 100° C. | Additive Volume resistivity (Ω·cm) | Miscibility | Autoclave test Sample oil appearance | Autoclave test Catalyst appearance | Autoclave test Volume resistivity | Total Acid Value Before test | Total Acid Value After test | Lubricity Abrasion (mgKOH/g) of pin (mg) | wear Practical Test |
|---|---|---|---|---|---|---|---|---|---|---|---|---|---|
| Inventive Example 1 | A | — | 22 | 4.7 | $1.0 \times 10^{15}$ | Miscible | Not Changed | Not Changed | $1.4 \times 10^{14}$ | 0.00 | 0.30 | 17 | Excellent |
| Inventive Example 2 | B | — | 44 | 6.2 | $1.0 \times 10^{15}$ | Miscible | Not Changed | Not Changed | $3.2 \times 10^{14}$ | 0.00 | 0.10 | 18 | Excellent |
| Inventive Example 3 | C | — | 30 | 5.5 | $6.9 \times 10^{14}$ | Miscible | Not Changed | Not Changed | $1.1 \times 10^{14}$ | 0.00 | 0.20 | 16 | Excellent |
| Inventive Example 4 | D | — | 68 | 8.3 | $1.2 \times 10^{15}$ | Miscible | Not Changed | Not Changed | $8.9 \times 10^{14}$ | 0.00 | 0.09 | 17 | Excellent |
| Inventive Example 5 | B | — | 24 | 6.0 | $1.0 \times 10^{15}$ | Miscible | Not Changed | Not Changed | $4.7 \times 10^{14}$ | 0.00 | 0.10 | 19 | Excellent |
| Inventive Example 6 | F | — | 52 | 7.1 | $7.8 \times 10^{14}$ | Miscible | Not Changed | Not Changed | $1.0 \times 10^{14}$ | 0.00 | 0.11 | 19 | Excellent |
| Inventive Example 7 | G | — | 110 | 14 | $2.7 \times 10^{14}$ | Miscible | Not Changed | Not Changed | $1.9 \times 10^{14}$ | 0.00 | 0.10 | 18 | Excellent |
| Inventive Example 8 | H | — | 7.5 | 2.1 | $6.2 \times 10^{14}$ | Miscible | Not Changed | Not Changed | $1.3 \times 10^{14}$ | 0.00 | 0.12 | 19 | Excellent |
| Inventive Example 9 | I | a(0.1) | 67 | 8.2 | $1.0 \times 10^{15}$ | Miscible | Not Changed | Not Changed | $3.6 \times 10^{14}$ | 0.00 | 0.01 | 17 | Excellent |
| Inventive Example 10 | D | b(1.0) | 67 | 8.2 | $8.3 \times 10^{9}$ | Miscible | Not Changed | Not Changed | $1.2 \times 10^{14}$ | 0.00 | 0.21 | 9 | Excellent |
| Comparative Example 1 | D | — | 45 | 9.1 | $2.3 \times 10^{9}$ | Phase-separated | Browned | Not Changed | $3.0 \times 10^{8}$ | 0.00 | 0.95 | 27 | Abrasion was found |
| Comparative Example 2 | J | — | 64 | 13 | $1.4 \times 10^{10}$ | Phase-separated | Browned | Not Changed | $1.1 \times 10^{9}$ | 0.00 | 0.80 | 26 | Abrasion was found |
| Comparative Example 3 | K | — | 66 | 8.2 | $1.0 \times 10^{14}$ | Phase-separated | Browned | Discolored | $5.9 \times 10^{10}$ | 0.00 | 1.00 | 24 | Abrasion was found |

The content of additives was based on the total mass of the sample oil

As apparent from the results in Table 1, the sample oils of Inventive Examples 1 to 10 containing a polyol ester as the ester oil of the present invention were found to be superior in lubricity, miscibility with a refrigerant, thermal stability, electric insulation and kinematic viscosity, all of which were well-balanced, when used together with a carbon dioxide refrigerant.

INVENTIVE EXAMPLES 11–17 AND COMPARATIVE EXAMPLES 4–9

The following sample oils were used in Inventive Examples 11 to 17 and Comparative Examples 4 to 9. Tables 2 and 3 show the properties (kinematic viscosity at 100° C.) of each of the sample oils.

INVENTIVE EXAMPLE 11

Carbonic ester having an average-molecular weight of 1,000 and represented by the formula $$\begin{array}{c} CH_2-CH-CH_2 \\ | \quad | \quad | \\ O \quad O \quad O \\ | \quad | \quad | \\ X \quad X \quad X \end{array}$$

wherein X represents the formula

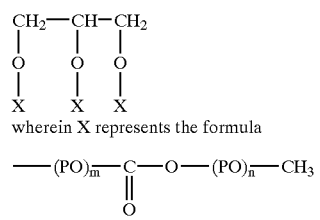

wherein $(PO)_m$ and $(PO)_n$ indicate a polyoxypropylene group, respectively.

INVENTIVE EXAMPLE 12

Carbonic acid ester having an average-molecular weight of 2,000 and represented by the formula

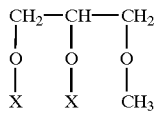

wherein X represents the formula

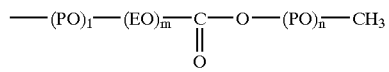

wherein $(PO)_1$—$(EO)_m$ is a random copolymer of a polyoxypropylene group and a polyoxyethylene group and indicates that the weight ratio therebetween is 90:10 and $(PO)_n$ indicates a polyoxypropylene group.

INVENTIVE EXAMPLE 13

Carbonic ester having an average-molecular weight of 2,000 and represented by the formula

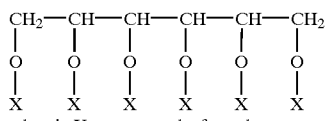

wherein X represents the formula

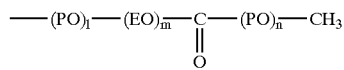

wherein $(PO)_1$—$(EO)_m$ is a random copolymer of a polyoxypropylene group and a polyoxyethylene group and indicates that the weight ratio therebetween is 90:10 and (PO)n is a polyoxypropylene group.

INVENTIVE EXAMPLE 14

Carbonic ester having an average-molecular weight of 2,000 and represented by the formula

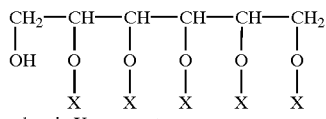

wherein X represents

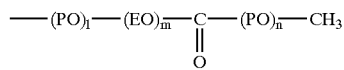

wherein $(PO)_1$—$(EO)_m$ is a random copolymer of a polyoxypropylene group and a polyoxyethylene group and indicates that the weight ratio therebetween is 90:10 and $(PO)_n$ is a polyoxypropylene group.

INVENTIVE EXAMPLE 15

Carbonic ester having an average-molecular weight of 1,000 and represented by the formula

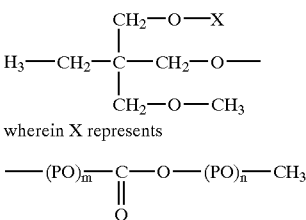

wherein X represents

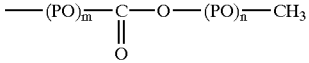

wherein $(PO)_m$ and $(PO)_n$ represent a polyoxypropylene group, respectively.

INVENTIVE EXAMPLE 16

Carbonic ester having an average-molecular weight of 2,000 and represented by the formula

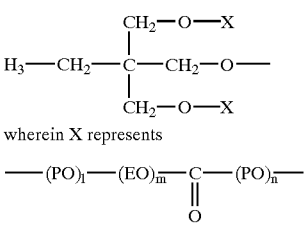

wherein X represents

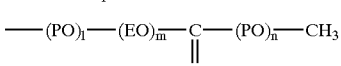

wherein $(PO)_1$—$(EO)_m$ is a random copolymer of a polyoxypropylene group and a polyoxyethylene group and indicates that the weight ratio therebetween is 90:10 and $(PO)_n$ indicates a polyoxypropylene group.

INVENTIVE EXAMPLE 17

Carbonic ester having an average-molecular weight of 2,000 and represented by the formula

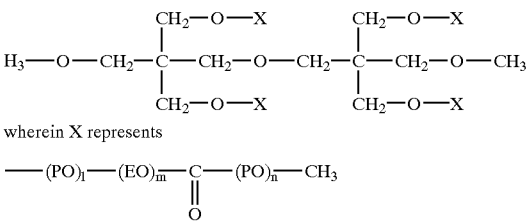

wherein X represents

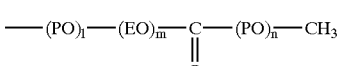

wherein $(PO)_1$—$(EO)_m$ is a random copolymer of a polyoxypropylene group and a polyoxyethylene group and indicates that the weight ratio therebetween is 90:10 and $(PO)_n$ represents a polyoxypropylene group.

COMPARATIVE EXAMPLE 4

Naphthenic mineral oil

COMPARATIVE EXAMPLE 5

Alkylbenzene oil of branched type (Number-average molecular weight: about 480)

COMPARATIVE EXAMPLE 6

Polyoxypropylene glycol (Number-average molecular weight: about 1,000)

COMPARATIVE EXAMPLE 7

Polyoxypropylene glycol monobutyl ether (Number-average molecular weight: about 2,000)

COMPARATIVE EXAMPLE 8

Polyoxypropyleneoxyethylene glycol dimethyl ether (Number-average molecular weight: about 2,000)

COMPARATIVE EXAMPLE 9

Copolymer of vinylethyl ether and vinylbutyl ether (Number-average molecular weight: about 900 EO:PO=7:1)

Each of the sample oils were subjected to the following tests.

Miscibility Test 0.5 gram of each of the sample oils were blended with 4.5 grams of a $CO_2$ refrigerant and then subjected to a test in accordance with "Testing method of evaluating miscibility with a refrigerant" prescribed in JIS K 2211 "Refrigerating machine oils" to observe if the refrigerant ant the sample oil would dissolve in each other or if they would be separated from each other or turned into a white-turbid liquid, at a temperature of 0° C. The results are shown in Tables 2 and 3.

Insulation Test

In accordance with JIS C 2101 "Testing method of electrical insulating oils", a test was conducted to measure the volume resistivity at 25° C. of each of the sample oils. The results are shown in Tables 2 and 3.

Thermal Stability Test 90 grams of each of the sample oils, 10 grams of a $CO_2$ refrigerant and catalysts (wire-shaped iron, copper and aluminum) were charged into an autoclave and heated at 175° C. After two weeks, a test was conducted so as to observe the appearance of both of the sample oils and the catalysts and measure the volume resistivity and total acid value of each of the sample oils. The results are shown in Tables 2 and 3.

TABLE 2

|  | Example 11 | Example 12 | Example 13 | Example 14 | Example 15 | Example 16 | Example 17 |
|---|---|---|---|---|---|---|---|
| VIS@100° C. | 11.5 | 27.1 | 32.2 | 28.4 | 10.9 | 28.1 | 35.2 |
| Volume Resistivity | $8.3 \times 10^{14}$ | $5.4 \times 10^{14}$ | $7.1 \times 10^{14}$ | $1.2 \times 10^{13}$ | $6.9 \times 10^{14}$ | $2.4 \times 10^{14}$ | $8.9 \times 10^{13}$ |
| Miscible | Miscible | Miscible | Miscible | Miscible | Miscible | Miscible | Miscible |
| Autoclave test |  |  |  |  |  |  |  |
| Sample oil Appearance | Not Changed | Not Changed | Not Changed | Not Changed | Not Changed | Not Changed | Not Changed |
| Catalyst Appearance | Not Changed | Not Changed | Not Changed | Not Changed | Not Changed | Not Changed | Not Changed |
| Volume Resistivity | $4.8 \times 10^{14}$ | $5.1 \times 10^{4}$ | $2.9 \times 10^{14}$ | $3.2 \times 10^{13}$ | $3.8 \times 10^{14}$ | $7.9 \times 10^{13}$ | $1.5 \times 10^{13}$ |
| Total acid value | 0.01 | 0.02 | 0.01 | 0.03 | 0.01 | 0.02 | 0.02 |

TABLE 3

|  | Comparative Example 4 | Comparative Example 5 | Comparative Example 6 | Comparative Example 7 | Comparative Example 8 | Comparative Example 9 |
|---|---|---|---|---|---|---|
| VIS@100° C. | 21.2 | 22.0 | 23.3 | 37.8 | 24.8 | 8.2 |
| Volume Resistivity | $7.0 \times 10^{15}$ | $1.2 \times 10^{16}$ | $2.8 \times 10^{10}$ | $9.1 \times 10^{10}$ | $2.1 \times 10^{11}$ | $2.9 \times 10^{14}$ |
| Miscibility | Separated | Separated | Separated | Separated | Separated | Separated |
| Autoclave test |  |  |  |  |  |  |
| Sample oil appearance | Not Changed | Not Changed | Not Changed | Not Changed | Not Changed | Not Changed |
| Catalyst appearance | Not Changed | Not Changed | Not Changed | Not Changed | Not Changed | Not Changed |
| Volume Resistivity | $4.8 \times 10^{15}$ | $7.9 \times 10^{15}$ | $2.1 \times 10^{10}$ | $3.4 \times 10^{10}$ | $6.2 \times 10^{10}$ | $3.6 \times 10^{13}$ |
| Total acid value | 0.01 | 0.02 | 0.02 | 0.01 | 0.02 | 0.01 |

As apparent from the results in Tables 2 and 3, the sample oils of Inventive Examples 1 to 10 containing a polyol ester as the ester oil of the present invention were found to be superior in lubricity, miscibility with a refrigerant, thermal stability, electric insulation and kinematic viscosity, all of which were well-balanced, when used together with a carbon dioxide refrigerant.

As described above, the refrigerating machine oil according to the present invention can reach a high standard in terms of all of the required properties such as miscibility with a refrigerant, thermal stability, electric insulation and kinematic viscosity.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A fluid composition for a refrigerating machine which comprises a refrigerating machine oil comprising an ester oil and a glycidyl ester epoxy compound, and a refrigerant containing carbon dioxide.

2. The fluid composition according to claim 1, wherein said ester oil is selected from the group consisting of aromatic esters, dibasic esters, polyol esters, complex esters and carbonic esters.

3. The fluid composition according to claim 2, wherein said ester oil is a carbonic ester.

4. The fluid composition according to claim 2, wherein said ester oil is a polyol ester.

5. The fluid composition according to claim 1, further comprising a phosphorus compound.

6. The fluid composition according to claim 1, wherein a total acid value of the refrigerating machine oil is less than 0.1 mg KOH/g.

7. The fluid composition according to claim 1, wherein a moisture content of the refrigerating machine oil is less than 200 ppm.

* * * * *